United States Patent [19]

Gerber

[11] 4,027,809

[45] June 7, 1977

[54] CHAFF COLLECTOR

[76] Inventor: Jerome J. Gerber, Murdock, Kans. 67111

[22] Filed: Dec. 8, 1975

[21] Appl. No.: 638,450

[52] U.S. Cl. .............................. 214/353; 214/507
[51] Int. Cl.² ............................................ B60P 1/00
[58] Field of Search .......... 214/501, 506, 509, 508, 214/522, 350, 353, 507

[56] References Cited

UNITED STATES PATENTS

| | | | |
|---|---|---|---|
| 2,482,160 | 9/1949 | Donogh | 214/353 |
| 2,624,482 | 1/1953 | Donogh | 214/353 |
| 3,092,272 | 6/1963 | Weigel | 214/501 |
| 3,123,239 | 3/1964 | Shoemake et al. | 214/508 |

Primary Examiner—L. J. Paperner
Assistant Examiner—Lawrence E. Williams
Attorney, Agent, or Firm—John H. Widdowson; Edwin H. Crabtree

[57] ABSTRACT

An improved chaff collector for towing behind a farm vehicle and receiving chaff therefrom. A conveyor is mounted on the collector and feeds chaff into a rotatably mounted drum. The drum is positioned at the rear of the collector and above the ground surface. When the drum is filled it automatically lowers and rotates on the ground surface unloading the chaff thereon. When the drum has unloaded the chaff it automatically returns to its original unloaded position on the collector.

4 Claims, 5 Drawing Figures

CHAFF COLLECTOR

BACKGROUND OF THE INVENTION

This invention relates generally to farm equipment towed behind a vehicle and more particularly but not by way of limitation to a chaff collector for collecting chaff and depositing it on the ground surface.

Heretofore there have been various types of collectors towed behind a farm vehicle for collecting chaff and straw and depositing it on the ground.

One type of prior art collector includes a wheeled frame with a collector drum rotatably mounted on the end of a frame. A conveyor is mounted on the frame and receives the chaff from the towing vehicle and conveys it into the drum. When the drum is full a locking mechanism on the frame is released and the drum is lowered onto the ground. As the collector is pulled behind the vehicle the drum rotates on the ground surface and the collected chaff is discharged from the drum onto the ground.

None of the prior art collectors disclose the novel features of the subject invention as herein described.

SUMMARY OF THE INVENTION

The improved chaff collector eliminates the need of manually releasing a drum filled with chaff so that it may be unloaded. The drum automatically unloads the collected chaff. The drum also automatically returns to its unloaded position on the collector when it has completed the unloading of the chaff. Also as the drum unloads the collected chaff it is prevented from unloading only a portion of the chaff before returning to its unloaded position.

The subject invention is simple in design and is easily pulled behind various types of farm vehicles. Because the collector automatically loads and unloads the collected chaff the collector is more efficient and time and labor is thereby reduced in this farming operation.

The improved chaff collector includes frame and drum supports rotatably mounted on a wheeled shaft. Attached to one end of the frame and drum supports is a conveyor frame with a conveyor mounted thereon. At the other end of the frame and drum supports is mounted a collecting drum with an open portion therein. The drum is positioned between the supports and the open portion of the drum and is disposed below the discharge end of the conveyor for receiving the chaff.

The advantages and objects of the invention will become evident from the following detailed description when read in conjunction with the accompanying drawings which illustrate the preferred embodiments of the invention.

DETAILED DESCRIPTION OF THE DRAWINGS

Figures 1, 1A, 2:
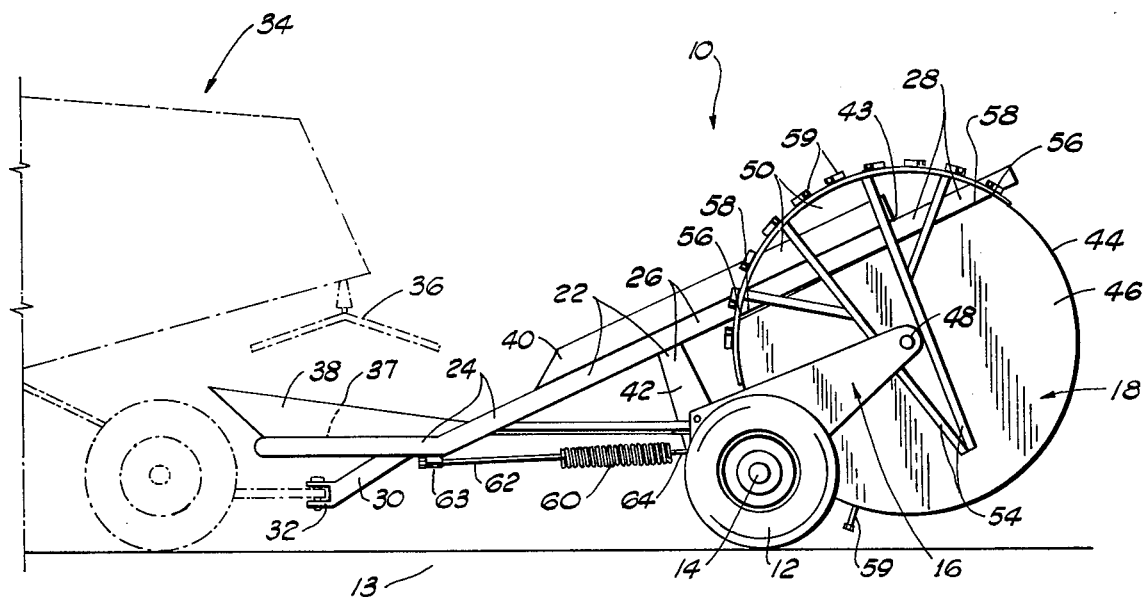
FIG. 1 is a side view of the improved chaff collector with the drum in an unloaded position.
FIG. 1a is an enlarged view of the conveyor frame and drum support.
FIG. 2 is a rear view of the improved chaff collector.

In FIG. 1 the improved chaff collector is designated by general reference number 10. The collector 10 includes a pair of wheels 12 resting on a ground surface 13 and mounted on a wheel shaft 14, a pair of frame and drum supports 16 rotatably mounted on the wheel shaft 14, a drum 18 rotatably mounted on the supports 16, and a chain driven conveyor 20 shown in FIG. 3 mountd on a conveyor frame 22 which is attached to the drum supports 16.

The conveyor frame 22 includes a front portion 24, a center portion 26, and a rear portion 28. The front portion 24 includes a flange 30 having a U-shaped end portion 32 for hitching the collector 10 to the rear of a towing vehicle 34. The rear of the vehicle 34 includes a spreader 36 for discharging the chaff onto the intake end 37 of the conveyor 20. The front portion 24 further includes a sloping hopper 38 surrounding the intake end 37 of the conveyor 20 for guiding the chaff onto the conveyor 20.

The center portion 26 of the frame 22 includes sloping side panels 40 which guide the chaff on the conveyor as the conveyor feeds the chaff into the drum 18. The center portion 26 of the frame 22 includes frame arms 42 which are secured to the drum supports 16.

The rear portion 28 of the frame 22 is disposed above the drum 18 and includes discharge end 43 of the conveyor 20 which feeds the chaff into the drum 18.

The drum 18 includes a cylindrical surface 44 integrally attached to drum sides 46. The drum 18 is rotatably attached to the supports 16 by a drum shaft 48 attached to the center of the drum sides 46. The axis of the shaft 48 is horizontal and parallel to the axis of the wheel shaft 14.

An open portion 50 of the drum 18 is provided in the cylindrical surface 44 for receiving the chaff into the remaining closed portion of the drum 18. A portion 52, shown in FIG. 2, of the cylindrical surface 44 between the portion 50 and the drum sides 46 is supported in place by braces 54 welded to the drum sides 46. The drum sides 46 of the open portion sides 56 of the open portion 50 rest against a bottom 58 of the rear portion 28 of the frame 22.

Attached to the cylindrical surface 44 of the drum 18 are cleats 59. The cleats 59 contact the ground surface 13 when the drum 18 unloads the collected chaff on the ground surface 13. The cleats 59 aid in the rotation of the drum 18 and prevent the drum 18 from sliding along the ground surface 13.

A coiled spring 60 is used to bias the drum 18 in an upward position above the ground surface 13. The coiled spring 60 has a first end 62 attached to the front portion 24 of the frame 22 and includes a screw adjustment 63 for adjusting the tension on the spring 60. A second end 64 of the spring 60 is adjustably attached to the support 16 and bias the support 16 in a counterclockwise direction about the wheel shaft 14.

In FIG. 1a an enlarged view of the support 16 is shown. Also in this view is a portion of the drum 18 and the frame arm 42. The support 16 supports the drum 18 and frame 22 with conveyor 20 mounted thereon except for any weight placed on the rear of the vehicle 34 where the collector 10 is attached thereto. The support member 16 also acts as a balancing means with the wheel shaft 14 acting as a fulcrum point.

The support 16 includes a front portion 70, a center portion 72, and a rear portion 74. The frame 22 is supported on the support 16 by attaching the frame arm 42 to the front portion 70 by a bolt 76. The arm 42 can be adjusted on the support 16 by bolt adjusting apertures 78. The center portion 72 of the support 16 is rotatably attached to the shaft 14. The rear portion 74 of the support 16 is rotatably attached to the shaft 48 of the drum 18.

The weight of the conveyor 20 and the frame 22 is placed on the front portion 70 of the support 16 via the frame arm 42, thereby causing the support 16 to rotate in a counterclockwise direction on the wheel shaft 14.

When the drum 18 is empty the weight of the frame 22 and the conveyor 20 is sufficient to overcome the counterweight of the drum 18 and the support 16 is rotated in a counterclockwise direction urging the drum 18 upward above the ground surface until the sides 56 of the open portion 50 come into contact with the bottom 58 of the rear portion 28 of the frame 22. At this point the drum 18 is held in place and the open portion 50 is disposed below the discharge end 43 of the conveyor 20 shown in FIG. 3 and the drum 18 is ready for receiving chaff therein.

As the chaff is collected the combined weight of the drum 18 and the collected chaff overcomes the counterweight of the conveyor 20 and frame 22 and automatically the drum 18 begins to move downward toward the ground surface 13. As the drum 18 approaches the ground surface 13 the cleats 59 contact the ground surface 13 and begin the rotation of the drum 18 on the drum shaft 48. Also as the drum 18 moves downward, the supports 16 rotating in a clockwise direction on the wheel shaft 14 urge the frame arm 42 upward thereby raising the frame 22 and the conveyor 20.

Shown in dotted lines is the position of the drum 18 when it comes in contact with the ground surface 13. The support member 16 and the attached frame arm 42 are rotated in a clockwise direction.

Also shown in this view is the second end 64 of the spring 60 attached to the front portion 70 of the support member 16 and having spring adjusting apertures 79 in the front portion 70 for adjusting the spring thereon. While the weight of the frame 22 and conveyor 20 is sufficient to balance the drum 18 in an upward position on the support members 16, the spring 60 is added to provide an additional biasing force in urging the drum 18 upward into its unloaded position under the rear portion 28 of the frame 22 after the drum 18 has completed the unloading of the chaff on the ground surface 13.

FIG. 2 is a rear view of the collector 10 as shown in FIG. 1. In this view the drum 18 can be seen with the sides 56 of the open portion 50 resting against the bottom 58 of the rear portion 28 of the frame 22.

Also seen in this view is the drum 18 with the drum shaft 48 extending from the drum sides 46 and rotatably attached to the supports 16 disposed on both sides of the drum 18 and adjacent the wheels 12.

Figure 3:
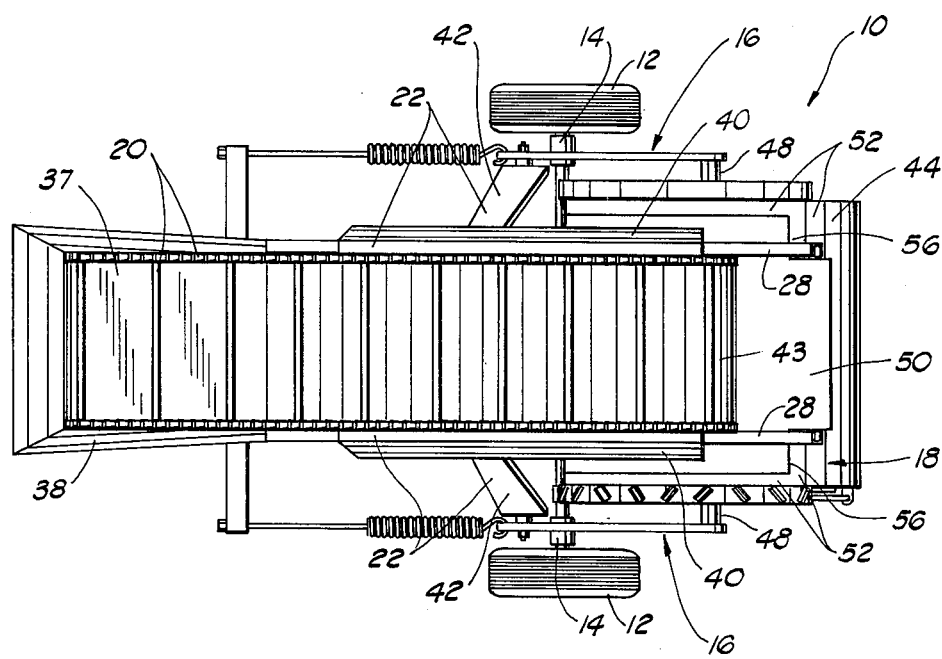
FIG. 3 is a top view of the improved chaff collector.

In FIG. 3 a top view of the collector 10 is shown. In this view the chain driven conveyor 20 can be clearly seen with the receiving end 37 surrounded by the sloping hopper 38 for guiding the chaff onto the conveyor 20 as it is received from the vehicle 34. As the chaff is conveyed up the conveyor 20 it is prevented from falling off the sides of the conveyor 20 by sloping side panels 40. The chaff is discharged from the discharge end 43 of the conveyor 20 at the rear portion 28 of the frame 22 and falls into the open portion 50 of the drum 18 and is collected therein.

Figure 4:
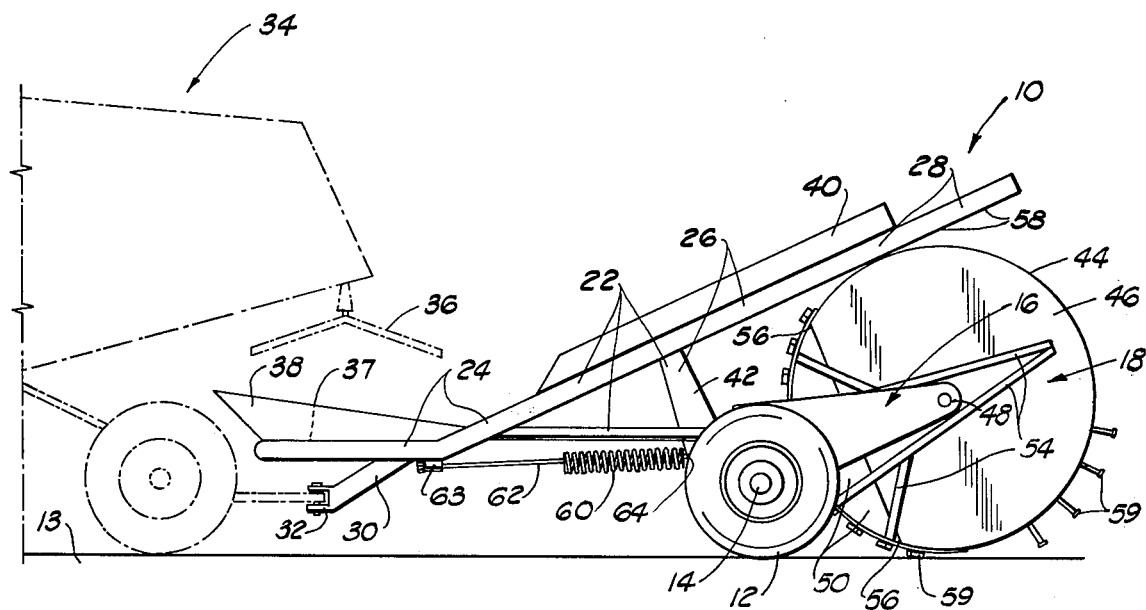
FIG. 4 is a side view of the improved chaff collector with the drum unloading the chaff on the ground surface.

In FIG. 4 the collector 10 is shown with the drum 18 in position for discharging the collected chaff onto the ground surface 13. As discussed under FIG. 1a the combined weight of the drum 18 and the collected chaff is sufficient when full to overcome the counter balanced weight of the frame 22 and conveyor 20 and the drum 18 is automatically lowers to the ground surface 13 and begins rotating on drum shaft 48. At this time the supports 16 rotate on the wheel shaft 14 in a clockwise direction urging the attached frame arm 42 in an upward position raising the frame 22 and conveyor 20 above the height of the drum 18. As the drum 18 begins to rotate on the ground surface 13 discharging the collected chaff, the cylindrical surface 44 of the drum 18 rides against the bottom 58 of the rear portion 28 of the frame 22 thereby preventing the drum 18 from moving upward to its unloaded position.

When the drum 18 has made a complete revolution and unloaded all of the collected chaff, the drum 18 automatically moves upward to its original unloaded position. At this time the supports 16 rotate in a counterclockwise direction lowering the frame 22 and conveyor 20 until the bottom 58 of the rear portion 28 of the frame 22 is again disposed against the sides 56 of the open portion 60 of the drum 18.

Changes may be made in the construction and arrangement of the parts or elements of the embodiment as disclosed herein with out departing from the spirit or scope of the invention as defined in the following claims.

I claim:

1. A chaff collector towed behind a vehicle and receiving chaff therefrom, the collector automatically unloading the chaff on the ground surface when the collector is full, the collector comprising:
    a pair of wheels mounted on a wheel shaft;
    conveyor and drum supports having a front portion, a center portion and a rear portion, the center portion of said supports rotatably mounted on said wheel shaft, said supports disposed adjacent said wheels;
    an endless conveyor mounted on a conveyor frame, said frame having a front portion, a center portion and a rear portion, the front portion of said frame attached to the rear of the vehicle, the center portion of said frame attached to the front portion of said supports and supported thereon; and
    a drum having a cylindrical surface with an open portion therein; the sides of the open portion resting against the bottom of the rear portion of said frame when said conveyor is loading shaft into said drum;
    said drum and said frame balanced on opposite ends of said supports so that the weight of said frame and said conveyor rotate said supports in a counterclockwise direction biasing said drum in an upward position above the ground surface when said drum is being located with chaff, when said drum is loaded with chaff the weight of the drum rotates said supports in a clockwise direction and said drum moves downward contacting the ground surface and unloading the chaff while rotating thereon.

2. The collector as described in claim 1 further including a spring biasing means for biasing said drum in an upward position above the ground surface, said biasing means having one end attached to said frame the other end attached to said supports.

3. The collector as described in claim 1 wherein the cylindrical surface of said drum rides against the bottom of the rear portion of said frame when said drum is rotating on the ground surface and unloading the collected chaff thereby preventing said drum from being biased upward until said drum has rotated 360° and the open portion of said drum is again disposed below the rear portion of said frame.

4. The collector as described in claim 1, further including cleats attached to the cylindrical surface of said drum, said cleats contacting the ground surface when said drum is filled with chaff and aiding the rotation of said drum on the ground surface as the chaff is unloaded from said drum.

* * * * *

UNITED STATES PATENT AND TRADEMARK OFFICE
CERTIFICATE OF CORRECTION

PATENT NO. : 4,027,809
DATED : June 7, 1977
INVENTOR(S) : Jerome J. Gerber

It is certified that error appears in the above-identified patent and that said Letters Patent are hereby corrected as shown below:

Column 2, line 40, after the first "the" insert --- open ---.

Column 4, line 61, Claim 1, delete "locating" and insert therefore --- loaded ---.

Signed and Sealed this

Twentieth Day of September 1977

[SEAL]

Attest:

RUTH C. MASON
Attesting Officer

LUTRELLE F. PARKER
Acting Commissioner of Patents and Trademarks